Feb. 2, 1971   E. O. OHLSON   3,559,320
FILM CARRYING FRAMES
Filed Jan. 27. 1969   2 Sheets-Sheet 1

INVENTORS:
E.O. Ohlson and K.E. Ohlson
BY
Richards + Geier
ATTORNEYS

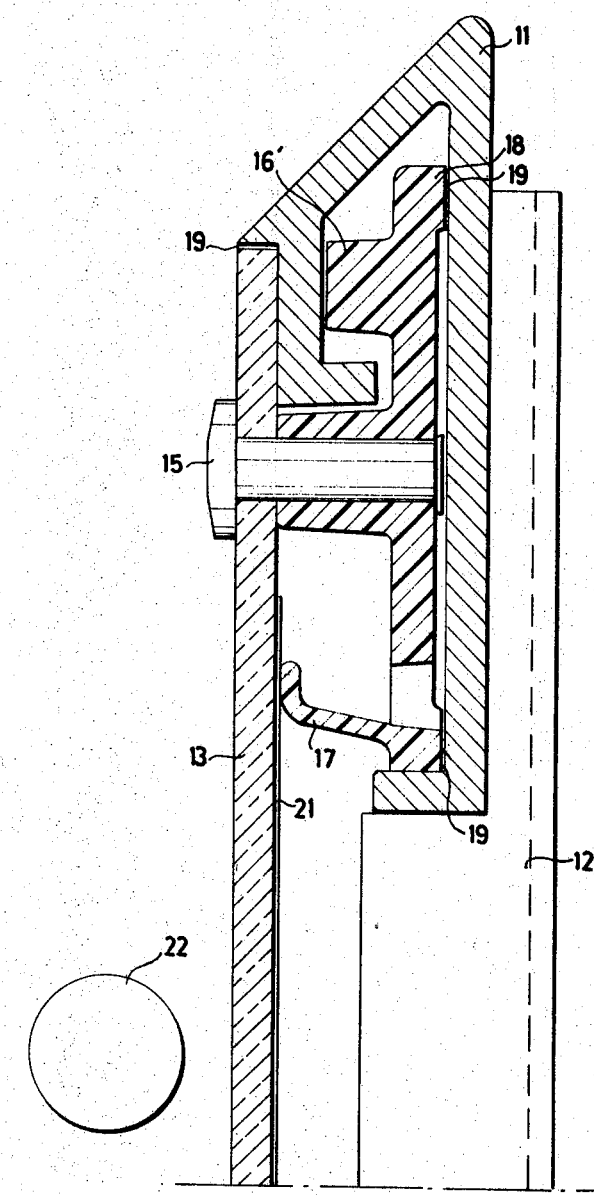
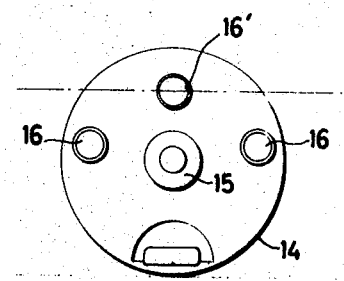

United States Patent Office 3,559,320
Patented Feb. 2, 1971

3,559,320
FILM CARRYING FRAMES
Eric Oscar Ohlson, Ankdammsgatan 29, and Karl-Eric Ohlson, Lovgatan 68, both of Solna, Sweden
Filed Jan. 27, 1969, Ser. No. 794,300
Claims priority, application Sweden, Feb. 20, 1968, 2,187/68
Int. Cl. G09f 11/00
U.S. Cl. 40—106.1
4 Claims

ABSTRACT OF THE DISCLOSURE

A translucent screen is connected to a frame by a series of resilient discs each of which is fixed by a pivot close to an edge of the screen and has at least one boss extending inside an elongated frame element, as well as a clamping web adapted to press an X-ray film or the like against the inner surface of the translucent screen.

---

The present invention relates to film carrying frames preferably of the kind, which are intended to be inserted into a magazine belonging to an automatic examination cabinet, whereby each such frame comprises rigid moulding elements, which can be assembled and are intended to support a translucent screen, on the front surface of which it is possible by clamping means to removably attach an X-ray film or the like.

In known frame designs of this type the translucent screen is connected with the frame structure by rivets or the like and means to attach the X-ray film or the like comprising different types of clamps, which are arranged horizontally between the vertical frame elements. The assembly of such frames is time-consuming and requires great precision.

The invention has two objects, one of which is to simplify the assembly of the frames and the other to make possible that at the same time and without extra cost for material and labor, means are provided for attaching current material to be examined in a manner permitting it to be removed quickly.

These objects are solved according to the invention by providing the opposite edges of the translucent screen with a number of means, such that the screen is arranged to be displaced into a position, where it is fixed relatively to the opposite moulding elements, and that said means are provided with webs or the like having a certain resiliency, which fit directly to the outward face of the screen or to a point close thereto, and which serve the purpose of providing clamping points for the material to be examined.

An embodiment of the invention is described below with reference to the accompanying drawings, in which:

FIG. 2 is a cross section along line II—II in FIG. 1 on an enlarged scale, and

FIG. 3 is a top plan view of an embodiment of the guiding means according to the invention.

Figure 1:
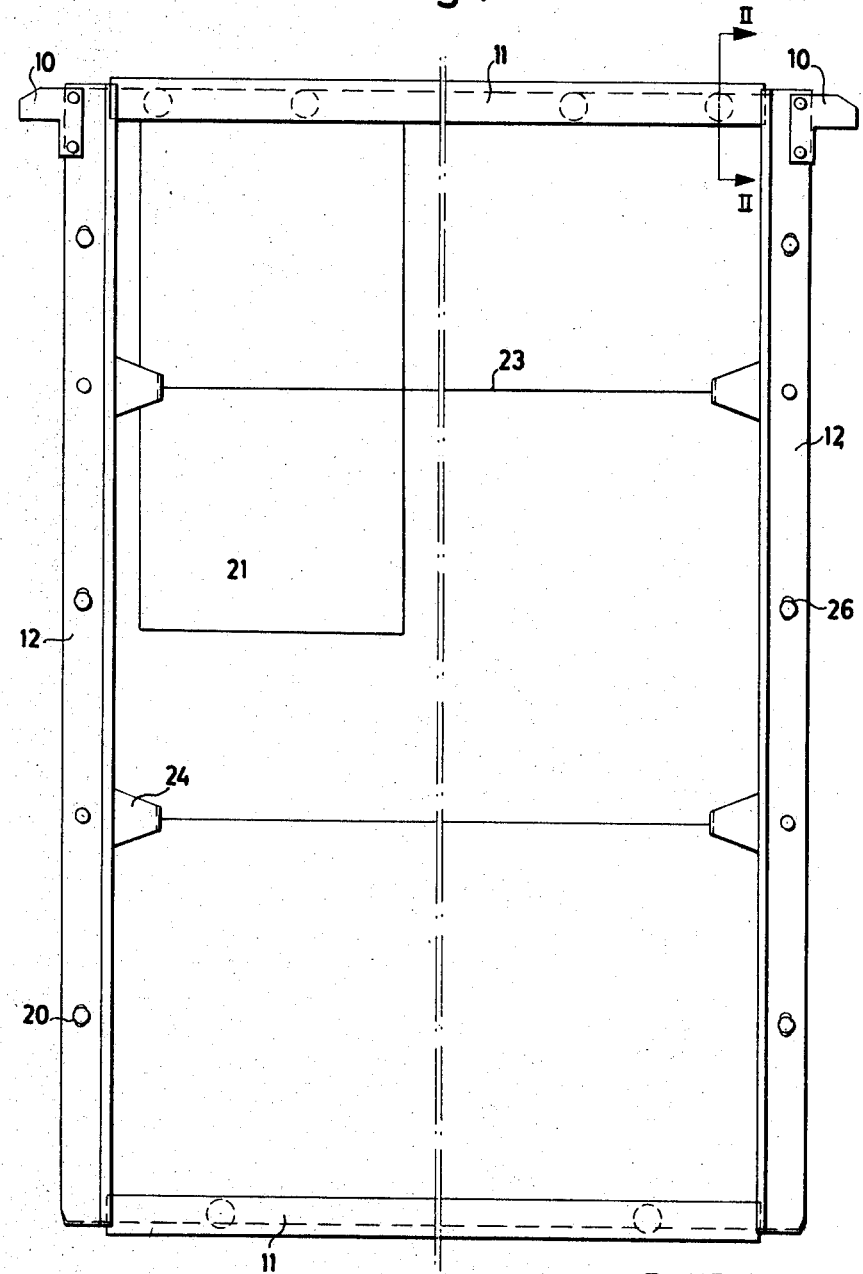
FIG. 1 is a front view of a film carrying frame according to the invention.

According to the invention a number of film carrying frames are inserted one after the other in a magazine (not shown) of an automatically functioning examination cabinet of known design.

Bracket 10 is a means for suspending a frame in a magazine. Four elements, which are arranged in pairs of identical design, are assembled into a frame. The elements 11 extending horizontally have a certain cross section and the vertical elements 12 have a different cross section.

A screen 13 of translucent material is provided along two opposite borders with a number of fixed means, the twofold function of which is to facilitate the mounting of the screen in the frame and to provide clamping points for the X-ray film.

As best shown in FIGS. 2 and 3 these means comprise a circular piece 14, which by means of a centrally located rivet 15 is rigidly mounted in the top portion of screen 13. The circular piece 14 is provided with round bosses 16, arranged on opposite sides of rivet 15 and with a rear boss 16; the piece or disc 14 is also provided with an outwardly projecting web 17 of certain resiliency. All the parts 16, 16' are an integral part of the circular piece 14, which is made of plastic material. The back of piece 14 is provided around its peripheral portion with a narrow annular rabbet 18.

A screen 13 provided with a number of fixed means of the described type and which together with a surrounding frame form a single unit, is particularly easy to assemble.

As best can be seen from FIG. 2 the screen with guiding means 14 belonging thereto is inserted into the two opposed horizontal moulding elements 11 from any one of the end portions. Since there is play existing between the guiding means and the moulding element which is indicated at 19, there are no difficulties involved in fixing the screen in the desired position. These spaces 19 in addition serve the purpose to avoid unfavorable effects due to tensions of the material. Thereafter the vertical elements 12 are connected by means of rivets 20 to the translucent screen 13. These rivets 20 are arranged in vertical slits in order to obliterate the effect of possible creep strain of the material.

The elements 11, 12 are connected by means of a rivet or screw joint.

A film carrying frame according to the invention is now ready to be used. By inserting from the front side the film 21 for examination between the point of web 17 and screen 13 a temporary fixing sufficiently stable for the desired purpose is obtained. The radioscopy is carried out by the aid of light sources 22 located behind the frame.

In case of especially long X-ray films or the like it may be convenient to arrange a support 23 extending across the screen, said support comprising thin threads fastened in supporting means 24 of element 12, which supporting means are displaceable along said elements.

As to design many different embodiments can be put into practice within the scope of the following claims.

We claim:
1. Film carrying frames, preferably of the kind, which are intended to be inserted one after another in rows in a magazine belonging to an automatic examination cabinet, whereby each such frame comprises rigid moulding elements, which elements can be assembled and are intended to support a translucent screen, to the front surface of which X-ray film or the like can be removably attached by clamping means, characterized by opposing side portions of the screen being provided with a number of means, which cooperate with the opposing moulding elements of the frame in such a way that the screen by displacement can be located in a fixed position relative to said opposing moulding elements, said means being provided with means of certain resiliency, which fit directly to the outward face of the screen or to a point close thereto, and which serve the purpose of providing clamping points for X-ray film.

2. Device according to claim 1, characterized by each guiding means having circular shape and by means of a centrally located rivet being rigidly mounted to the screen and further being provided with guiding bosses, which, when inserting the screen into the moulding elements of the frame facilitate the guiding in horizontal direction.

3. Device according to claim 1, characterized by the resilient webs being directly shaped as an integral part of the guiding means and consisting of the same material.

4. Device according to claim 1, characterized by the guiding means being provided with an annular bead rabbet around the peripheral portion of its rear side serving the purpose to fit to the internal rear wall of the moulding frame.

References Cited

UNITED STATES PATENTS

| | | | |
|---|---|---|---|
| 1,500,867 | 7/1924 | Glover | 40—106.1 |
| 1,989,803 | 2/1935 | Hoben | 40—106.1 |
| 2,107,738 | 2/1938 | Klaus | 40—106.1 |
| 2,755,585 | 7/1956 | Lubow | 40—106.1 |

LAWRENCE CHARLES, Primary Examiner